United States Patent [19]
Wong et al.

[11] Patent Number: 6,137,876
[45] Date of Patent: Oct. 24, 2000

[54] NETWORK CALL TRACE

[75] Inventors: Ping Wong; Lars A. Tovander, both of Plano, Tex.

[73] Assignee: Ericsson Inc, Research Triangle Park, N.C.

[21] Appl. No.: 08/984,816

[22] Filed: Dec. 4, 1997

[51] Int. Cl.[7] ............................. H04M 7/00; H04M 3/00
[52] U.S. Cl. ...................... 379/246; 379/220; 379/230; 379/272; 379/311
[58] Field of Search .................................. 379/220, 229, 379/230, 245, 246, 272, 280, 311, 34, 94.2, 211; 455/406, 456

[56] References Cited

U.S. PATENT DOCUMENTS

| | | | |
|---|---|---|---|
| 4,464,543 | 8/1984 | Kline et al. | 179/8 R |
| 5,438,570 | 8/1995 | Karras et al. | 370/94.2 |
| 5,572,583 | 11/1996 | Wheeler, Jr. et al. | 379/207 |
| 5,592,530 | 1/1997 | Brockman et al. | 379/34 |
| 5,598,464 | 1/1997 | Hess et al. | 379/213 |
| 5,727,057 | 3/1998 | Emery et al. | 379/211 |
| 5,809,121 | 9/1998 | Elliott et al. | 379/127 |
| 5,842,125 | 11/1998 | Modzelesky et al. | 455/426 |

FOREIGN PATENT DOCUMENTS

| | | |
|---|---|---|
| 1289884 | 2/1969 | Germany . |
| WO 96/16515 | 5/1996 | WIPO . |
| WO 96/16516 | 5/1996 | WIPO . |
| WO 97/12473 | 4/1997 | WIPO . |

OTHER PUBLICATIONS

Russell, Travis., *Signaling System #7*, Overview of ISUP, McGraw–Hill Series on Computer Communications, Chapter 9, pp. 321–448.

Lichter, J.J., *Generic Switching and Signaling Requirements for Number Portability*, Issue 1.03, Sep. 4, 1996, Illinois Number Portability Workshop.

*Primary Examiner*—Krista Zele
*Assistant Examiner*—Allan Hoosain
*Attorney, Agent, or Firm*—Jenkens & Gilchrist

[57] ABSTRACT

A Network Call Trace (NCT) method and system enables a call path route to be traced in a telecommunications network. A Type of Digit (TOD) in the Generic Digits Parameter (GDP) for an Integrated Services Digital Network (ISDN) User Part (ISUP) command can be utilized to realize the NCT. A listing of Switch IDs (SIDs) from the originating subscriber's switch to the terminating subscriber's switch is provided so that routing inefficiencies can be discovered. In one embodiment, an Initial Address Message (IAM) is transmitted with a TOD Network Call Trace in the GDP. The NCT includes the SID of the originating switch. Any intermediate switches between the originating switch and the terminating switch likewise append their own SID onto the NCT list of SIDs. Finally, the terminating switch also adds its SID onto the end of the NCT list. This NCT list may then be transmitted and displayed for analysis. For example, it may be transmitted in a backward message such as address complete message (ACM), answer message (ANM), call progress (CPG), or release (REL) back to the originating switch via the network. Alternatively, the NCT list may be sent to a Network Management Center.

34 Claims, 6 Drawing Sheets

NETWORK CALL TRACE

BACKGROUND OF THE INVENTION

1. Technical Field of the Invention

The present invention relates to telecommunications systems and, in particular, to implementing a call trace mechanism at the network level in a telecommunications system.

2. Description of Related Art and Objects of the Invention

Today's telephone networks provide many new, exciting, and convenient features. For example, caller identification (ID), call blocking, and call return were not available a few years ago, but they are greatly appreciated by many people today. The telephone network of today that enables these features is actually composed of two networks. The first network provides control and signaling capabilities, while the second network transmits the actual voice and data information of the telephone user.

The control and signaling network is commonly termed Signaling System #7 (SS7). It began as a means to enable toll-free 800 numbers and evolved to provide much more, such as caller ID as noted above. As an additional example of what SS7 provides: SS7 is used to remotely control the voice and data network (voice network). The voice network itself is composed of, in part, switches, user telephones, interconnecting voice trunks, and linking phone lines.

Figure 1:
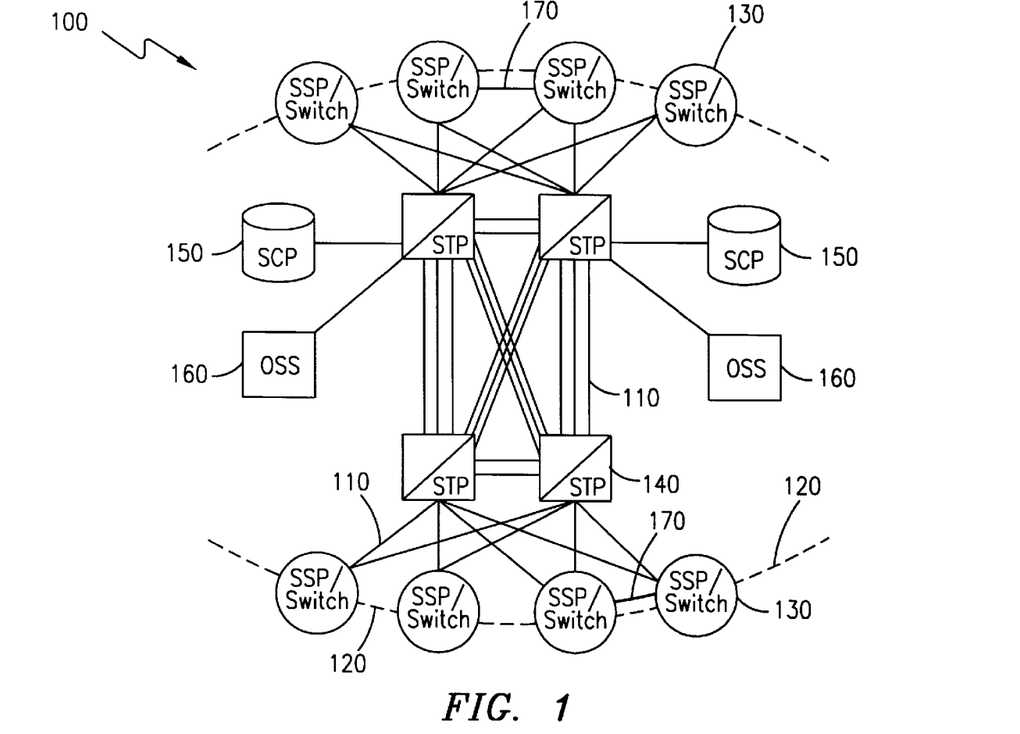
FIG. 1 illustrates a general telephone network employing Signaling System #7 (SS7)

Referring now to FIG. 1, SS7/voice network 100 is diagramed. Though the SS7 network is separate from the voice network, they are diagramed together for two reasons. First, diagraming them together facilitates an understanding of the logical interrelationship between the two networks. Second, the computers that comprise the SS7 network are often physically located within the same exchange offices as the telephone switches.

Continuing with FIG. 1, the signaling paths of the SS7 network are denoted by the solid lines 110 while the voice trunks are denoted by the broken lines 120. The multiple SSP/Switches 130 represent two elements. The Service Switching Point (SSP) is the local exchange in the telephone network. It should be understood that the term "SSP" can actually connote (i) a combination voice switch and SS7 switch or (ii) an adjunct computer connected to the local exchange's voice switch. In other words, "SSP" represents both the SS7 and the voice network and will be so used except in connection with FIG. 1, where "SSP/Switch" is used to highlight the distinction between the two networks. Each SSP/Switch 130 is connected to at least one other SSP/Switch 130 by a voice trunk 120, which provides the conduit for the voice and data traffic of the user.

Each SSP/Switch 130 is also connected to the remainder of the SS7 network via signaling paths 110 to at least one Signal Transfer Point (STP) 140. The multiple STPs 140 route the messages that are transmitted over the SS7 network to control operation of the voice network. It is noted that some SSP/Switches 130 are directly connected to other SSP/Switches 130 via a direct SS7 signaling path 170. Continuing with the operation of the SS7 network, select STPs 140 are in communication with a Service Control Point (SCP) 150. The SCPs 150 are interfaces to telephone company databases, which store information about subscribers' services, routing of special service numbers (e.g;, 800 and 900 numbers), calling card validation, Advanced Intelligent Network (AIN) services, etc. Finally, Operations Support Services (OSSes) 160 represent the remote maintenance centers for the monitoring and management of the SS7 network.

Message transmission over the signaling paths 110 (and impliedly, the direct SS7 signaling paths 170) is effectuated by using Integrated Services Digital Network (ISDN) User Part (ISUP) signaling. The ISUP protocol enables today's modern telephone features, e.g., call waiting and call forwarding. Moreover, ISUP is the means for establishing a telephone connection from a calling party (originating subscriber), through one or more SSP/Switches 130, and finally to a called party (terminating subscriber). ISUP messages are sent from an originating subscriber's SSP/Switch 130 over the SS7 network, usually through at least one STP 140, to a different SSP/Switch 130. Often the ISUP message for establishing a call passes through multiple SSP/Switches 130; once the terminating subscriber's SSP/Switch 130 is reached via the SS7 network, a voice circuit along voice trunk 120 and through multiple SSP/Switches 130 is also established.

Unfortunately, this setup procedure can be inefficient. The voice circuit will not necessarily be routed along the shortest possible length of the voice trunk 120. This can result in delays for the call setup process and a squandering of parts of the expensive telephone infrastructure, namely voice trunk 120 resources and any extraneous SSP/Switches 130. To avoid wasting the telephone infrastructure, a tool to enhance the ability to test and optimize call routing is needed. A tool that can trace a current routing and submit the trace results for diagnosis is also needed.

Figure 2:
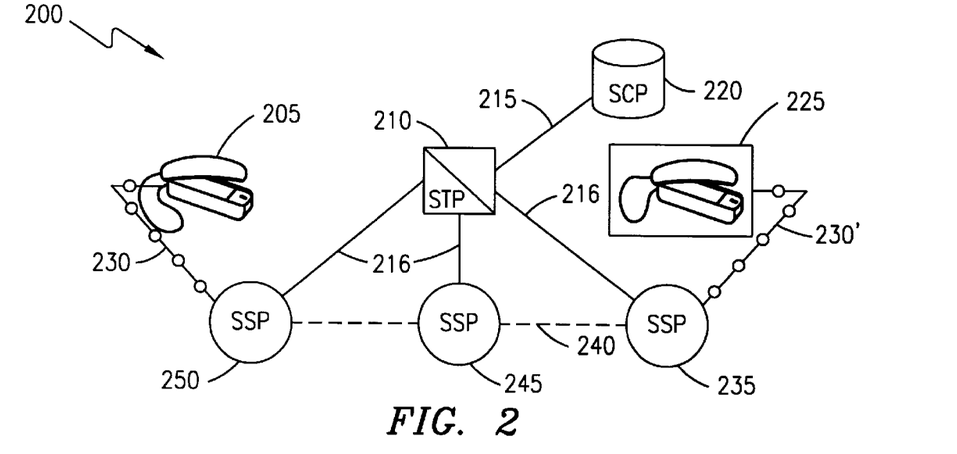
FIG. 2 illustrates a portion of the telephone network shown in FIG. 1, incorporating local number portability (LNP)

The probability of inefficient routing is exacerbated with another new feature of today's telephone network: local number portability (LNP). With reference now to FIG. 2 for an example of an LNP 200. Traditionally, each SSP 235, 245, and 250 is assigned a set of phone numbers, typically based on the first three of the seven phone digits. (It is reiterated here that "SSP" actually connotes both an interface to the SS7 network and a switch in the voice network and that it will be used in this context throughout the remainder of the document.) In other words, the SSPs 235, 245, and 250 of the LNP 200 are assigned at least phone numbers 235-XXXX, 245-XXXX, and 250-XXXX, respectively.

Continuing with FIG. 2, the SSPs are connected to one another (directly or indirectly) over the voice network via a voice trunk 240. The SSP 250 is connected to Originating Phone 205 by a linking phone line 230, (delineated by the line/circle combination, and the SSP 235 is also connected to a Terminating Phone 225 by another linking phone line 230'. Each SSP is also connected to the STP 210 along signaling paths 216, which transmit ISUP messages. Finally, the STP 210 is also in communication with SCP 220 along a signaling path 215.

With further reference to FIG. 2, the SSP 250 is an Originating Switch, where the phone call originates; the SSP 245 is an Intermediate Switch, where the phone call must be routed through; and the SSP 235 is a Recipient Switch (the recipient of the ported number), where the phone call to the ported number will ultimately terminate. Another SSP (not pictured) is the Donor Switch, where the ported number was originally assigned. In the LNP 200, a ported number is 255-XXX1. A user at the Originating Phone 205 dials 255-XXX1, and the Originating Switch/SSP 250 utilizes ISUP messages across signaling path 216 to communicate with the STP 210, which (also utilizing ISUP protocol) accesses the databases represented by the SCP 220 to determine which switch is now associated with the ported number 255-XXX1. This information is then forwarded to the Originating Switch/SSP 250, which then begins the call setup procedure. The setup proceeds through the Intermediate Switch/SSP 245 and subsequently terminates on the Recipient Switch/SSP 235.

Unfortunately, most routing does not proceed so simply and efficiently. Several, and even many, intermediate switches may be traversed along the path to a given Recipient Switch. As stated above, inefficient routing already afflicts the telephone system. Additionally, looping and errors in the AIN database also already adversely impact telephone system performance. Now, with the complexity of LNP deployment, there are more opportunities for routing errors at the network level. For instance, some SSPs do not have the ability to recognize a ported number. As a result, the call is initially routed to the donor switch, and then the donor switch consults an SCP to determine the identity of the recipient switch. Finally, the donor switch is able to begin establishing the connection appropriately. This convoluted process further entangles the routing process.

Moreover, at present there are several types of LNP. The LNP 200 described with respect to FIG. 2, for example, is Location Portability, where a phone number is retained after the subscriber physically moves. A second type of LNP is Service Portability, where a phone number is retained after changing services. A third type of LNP is Service Provider Portability, where a phone number is retained after changing phone service providers. These second and third LNP categories also further complicate the routing process and thereby introduce even more opportunities for inefficient or incorrect call routing. Consequently, a tool is needed to enable the detection of exchange routing errors in the network by producing a list of the switches through which a call is routed. Heretofore, there has been no call trace mechanism at the network level using ISUP signaling.

A non-exhaustive list of objects of the invention follows:

An object of the invention is to provide a network call trace ability.

A further object of the invention is to provide a network call trace ability using ISUP signaling.

Another object of the invention is to provide a network call trace ability using ISUP signaling in a SS7 network.

It is also an object of the invention to implement a network call trace by tagging Switch IDs (SIDs) onto the Initial Address Message (IAM).

Yet another object of the invention is to implement a network call trace by using the IAM Generic Digits Parameter (GDP) with a Type of Digit (TOD) Network Call Trace.

A still further object of the invention is to implement a network call trace that returns a list of SIDs to the originating switch in the first backward message.

SUMMARY OF THE INVENTION

A Network Call Trace (NCT) feature is implemented within a network, such as a telecommunications network, as both a method and an apparatus. The invention produces a list of nodes through which a communication has been routed. This list of nodes can then be provided for analysis.

According to one embodiment of the invention, a telecommunications system/network, includes a set of switches through which a call is routed from an originating subscriber to a terminating subscriber. Each switch has an identification (SID) that it attaches to the NCT list of switching nodes. Initially, the switch associated with the originating subscriber transmits the NCT list with one SID, its own. Subsequently, each intermediate switch adds its own SID to the NCT list before forwarding the list to the next downstream (nearer the termination point or at the termination point) switch. Finally, the switch associated with the terminating subscriber appends its SID to the NCT list. The SID listing representing the call routing is then ready for analysis.

According to another embodiment of the invention, ISUP signaling protocol is used in the telecommunications network. The network call trace command and NCT list is transmitted over the network in an Initial Address Message (IAM) during the call setup procedure. Specifically, a new Type of Digit (TOD) in the Generic Digits Parameter (GDP) of the IAM is established: the Network Call Trace TOD. This NCT TOD causes each switch to append its SID onto the IAM during call setup.

According to another embodiment of the invention, the final NCT list (it becomes final once the terminating subscriber's switch adds its SID) is transmitted back over the network to the originating subscriber's switch in a first backward message, such as answer message (ANM), address complete message (ACM), call progress (CPG), or release message (REL). The final NCT list can then be analyzed at the originating point of the test call. Alternatively, the terminating switch can forward the final NCT list along with other call information to a network management center.

According to yet another embodiment of the invention, each intermediate switch (a switch through which a call is routed that is neither originating nor terminating) stores the NCT list as it exists up to the point of that intermediate switch (which equates to a list with the upstream switches and the intermediate switch itself). This guards against the possibility of downstream switches being incapable of implementing the NCT TOD. If an intermediate switch receives a final backward message, such as REL, without contemporaneously or previously receiving a corresponding (corresponds to the same call) NCT list longer than the one it stored, then the intermediate switch will retrieve its stored list and append it to the final backward message for transmission to the originating switch. This enables call tracing to the farthest point NCT TOD is implemented.

According to yet another embodiment, allowance is made for situations where an NCT list becomes excessively long. For example, if the NCT list begins to exceed the maximum permitted length of an ISUP message, then the NCT list can be truncated by deleting the SIDs of the switches that are the furthermost downstream.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

A preferred embodiment of the present invention and its advantages are best understood by referring to FIGS. 3A–7B of the drawings, like numerals being used for like and corresponding parts of the various drawings.

Figure 3A:
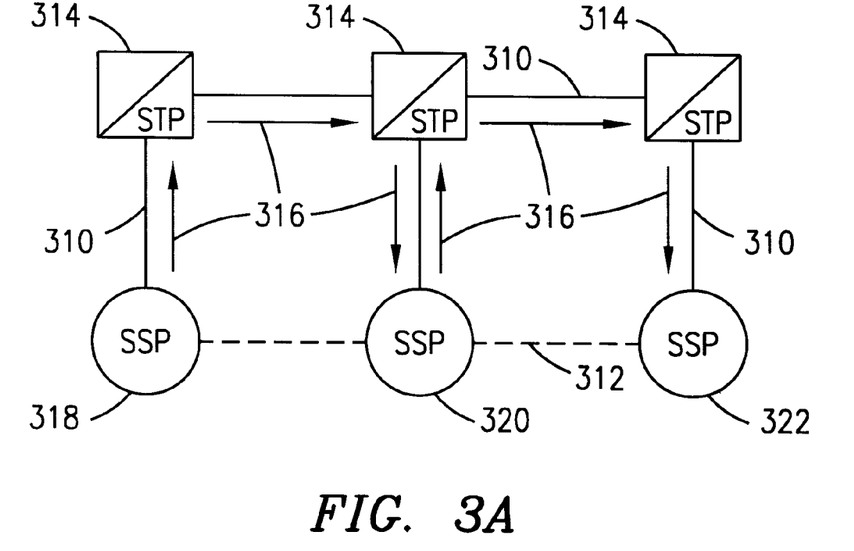
FIG. 3A illustrates the beginning of a call setup procedure on a general level with an intermediate exchange.

Referring first to FIG. 3A, the beginning of a call setup procedure is illustrated. SSPs 318, 320, and 322 are connected by a voice trunk 312 (the broken lines). SSPs 318, 320, and 322 are also linked to the SS7 network by signaling paths 310 (the solid lines). Also linked into the SS7 network are the three STPs 314. Each message arrow 316 represents a message being transmitted over the SS7 network. In this example, a calling party whose exchange is the SSP 318 is attempting to contact a called party whose exchange is the SSP 322. The SSP 318 transmits an ISUP command initial address message (IAM) over the SS7 signaling paths 310. The IAM follows the message arrows 316 over the SS7 network. After passing through two STPs 314, the IAM reaches SSP 320. A connection is then established between SSP 318 and SSP 320. To complete the end-to-end setup procedure, SSP 320 transmits another ISUP setup message IAM, this one destined for SSP 322 to establish a connection between SSPs 320 and 322. In this fashion, the ISUP message IAM hops from one SSP to another until a voice circuit from the calling party to the called party is reserved.

Figure 3B:
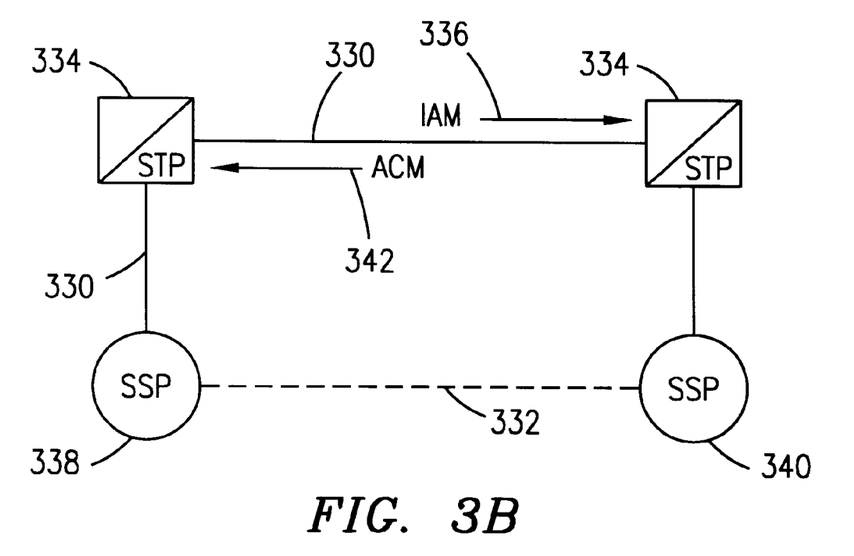
FIG. 3B illustrates the middle of a call setup procedure.

Referring now to FIG. 3B, a first backward message is illustrated. SSPs 338 and 340 are connected by voice trunk 332 (the broken line), and each SSP is also linked to the SS7 network by signaling paths 330 (the solid lines). Also linked to the SS7 network are STPs 334. In this example, a calling party whose exchange is SSP 338 is attempting to contact a called party whose exchange is 340. The setup process begins by the SSP 338 sending an IAM 336 over the SS7 network. Once the SSP 340 receives the IAM 336, the SSP 340 replies with a backward message, i.e., an address complete message (ACM) 342, which is transmitted over the SS7 network's signaling paths 330 to the SSP 338. The ACM 342 acts as an acknowledgment and also implies that ringing is occurring at the called party. Once the called party removes the phone from the hook, voice trunk 332, which was merely reserved, is cut through for voice/data transmission by the calling and called parties.

Figure 3C:
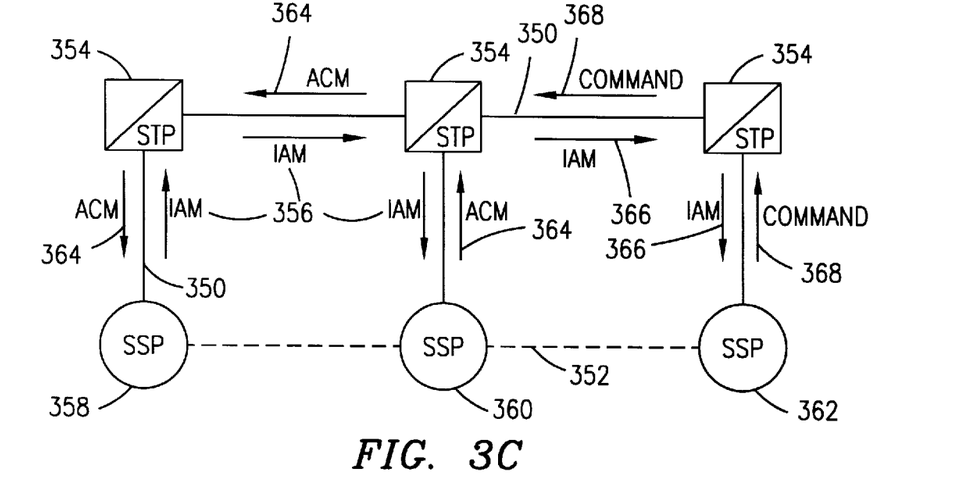
FIG. 3C illustrates a call setup procedure on a detailed level with an intermediate exchange.

Referring now to FIG. 3C, a call setup procedure is illustrated that includes an intermediate tandem exchange. SSPs 358, 360, and 362 are interconnected by a voice trunk 352 and are connected to the SS7 network over signaling paths 350. The STPs 354 are also connected to the SS7 network over the signaling paths 350. In this example, a calling party whose exchange is SSP 358 is attempting to contact a called party whose exchange is SSP 362. As explained with respect to FIG. 3A, the SSP 358 transmits an ISUP command initial address message (IAM) over the SS7 signaling paths 350. An IAM 356 first reaches the SSP 360. In response, the SSP 360 transmits the ACM 364 back to the SSP 358 to thereby indicate that a connection between the SSP 358 and the SSP 360 has been reserved (as well as to indicate that ringback to the calling party at SSP 358 can be sent).

Meanwhile, SSP 360 is also preparing to extend the connection by sending an IAM 366 to the SSP 362. It should be understood that although only one intermediate exchange is included in this example, many may be required to reach the terminating exchange. Once the SSP 362 receives the IAM 366, the SSP 362 must decide which ISUP message to return. If the called party has a busy line, for example, a release message (REL) is sent back over the SS7 network as a Command 368 to (eventually after passing through SSP 360) the SSP 358 and the reserved voice trunk line is immediately released. If the called party is available, then the SSP 362 replies with an ACM as the Command 368. Also, once the called party answers, the SSP 362 sends the answer message (ANM) as the Command 368 to (eventually) SSP 358. It should also be understood that ANM is the command that causes the SSPs to end the mere reservation of the voice trunk 352; ANM causes these to cut through for actual voice/data transmission by the calling and called parties. The REL command is also used, when either party hangs up, to signal via the SS7 network to release the voice trunk. In response, the switch receiving the REL message responds with release complete (RLC). It should therefore, be understood that ACM, REL, ANM are each backward messages. Another backward message is call progress (CPG), which is used to notify a distant exchange that some call-related (non-error and non-catastrophic) event has occurred.

Figure 4A:
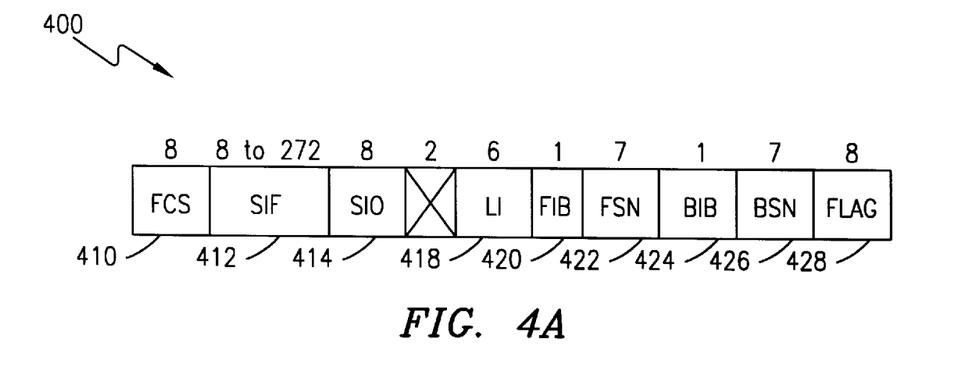
FIG. 4A illustrates the format for a Message Signal Unit (MSU)

Referring now to FIG. 4A, the format for a Message Signal Unit (MSU) 400 is diagramed. The MSU 400 provides the structure for transmission according to the ISUP protocol. The digits above the respective fields represent the number of bits in that field, except for those above field 412, which represent the number of octets therein. The field abbreviations within the MSU 400 are defined as follows: an FCS 410 is the Frame Check Sequence, an SIF 412 is the Signaling Information Field, an SIO 414 is the Service Indicator Octet, an LI 418 is the Length Indicator, an FIB 420 is the Forward Indicator Bit, an FSN 422 is the Forward Sequence Number, a BIB 424 is the Backward Indicator Bit, a BSN 426 is the Backward Sequence Number, and a FLAG 428 is the Open/Closed Flag.

Figure 4B:
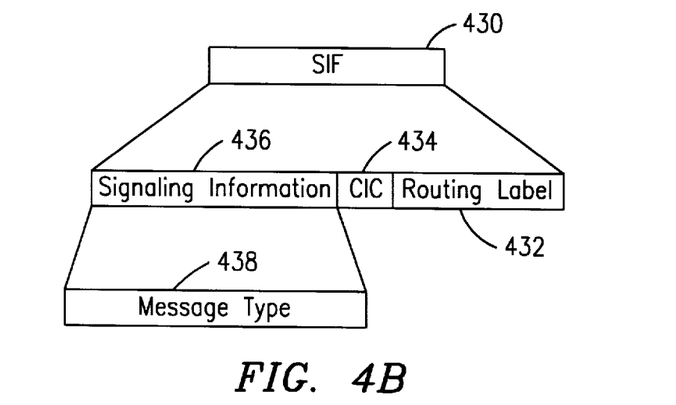
FIG. 4B illustrates the Signaling Information Field (SIF) of the MSU shown in FIG. 4A.

Referring now to FIG. 4B, a Signaling Information Field (SIF) 430 of an MSU, e.g., the SIF 412 in FIG. 4A, is diagramed to illustrate some constituent parts. The constituent subfield parts shown are a Routing Label 432, a Circuit Identification Code (CIC) 434, and a Signaling Information 436. The Circuit Identification Code (CIC) field 434 identifies the circuit being set up or released, e.g., a voice trunk. The Signaling Information field 436 includes a Message Type field 438 and its accompanying Mandatory Fixed, Mandatory Variable, and Optional Parts. One example of the Message Type 438 of the Signaling Information 436 is illustrated and described hereinafter in connection with FIG. 4C.

Figure 4C:
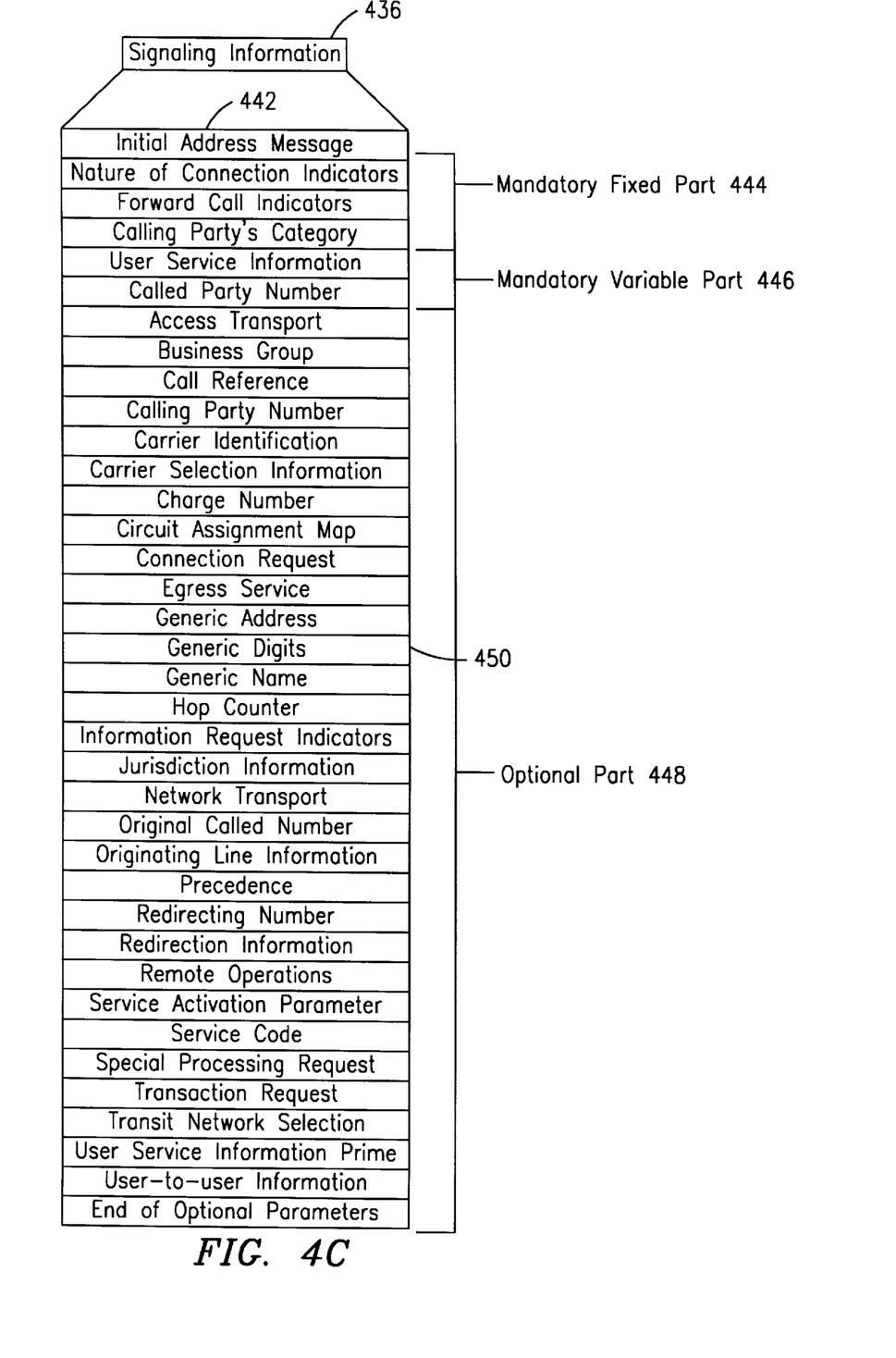
FIG. 4C illustrates various details of an Initial Address Message (IAM) of the Signaling Information field of an SIF as shown in FIG. 4B.

Referring now to FIG. 4C, details of an Initial Address Message (IAM) 442 message type are shown, which illustrates how the IAM 442 occupies the Signaling Information 436 portion of the SIF 430 (of FIG. 4B). The IAM 442 is composed of a Mandatory Fixed Part 444, a Mandatory Variable Part 446, and an Optional Part 448. Within the Optional Part 448 is a Generic Digits field 450. The Generic Digits Parameter (GDP) provides additional numeric data pertaining to supplementary services. The first octet of the GDP is the Type of Digit (TOD). Type of Digits categories have heretofore included, for example, authorization codes, PIN numbers, and account codes.

Figure 5:
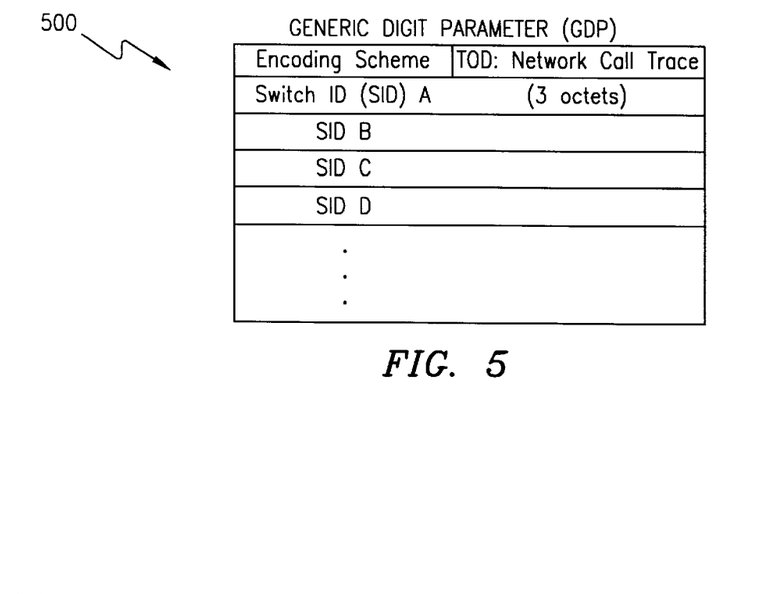
FIG. 5 illustrates a new Generic Digit Parameter (of an IAM) Type of Digits category, namely Network Call Trace (NCT), according to a preferred embodiment of the invention.

Referring now to FIG. 5, a new GDP TOD category according to a preferred embodiment of the invention is illustrated. The new TOD is Network Call Trace (see FIG. 5, Element 500) and is one embodiment of a Network Call Trace effectuate according to the invention. With Network Call Trace, the connection path across a network using ISUP signaling can be traced. Each switch in the network is assigned a Switch Identification (Switch ID, or SID). Preferably, the SID corresponds to 3 octets, which is the 24-bit Signaling Point Code. However, the invention can be practiced with equal efficacy with other SID schemes; for example, a 32-bit SID is used for international calls. Of the three octets, the first is the network number (n), the second is the member number (m), and the third octet is the cluster number (c). (Thus, the SID is composed of three octets, n-m-c.) Returning to the Network Call Trace TOD for the GDP at 500, the Encoding Scheme is illustrated. It is shown how each switch, which becomes a node for the relevant call connection, is added to the list of switches.

Figure 6:
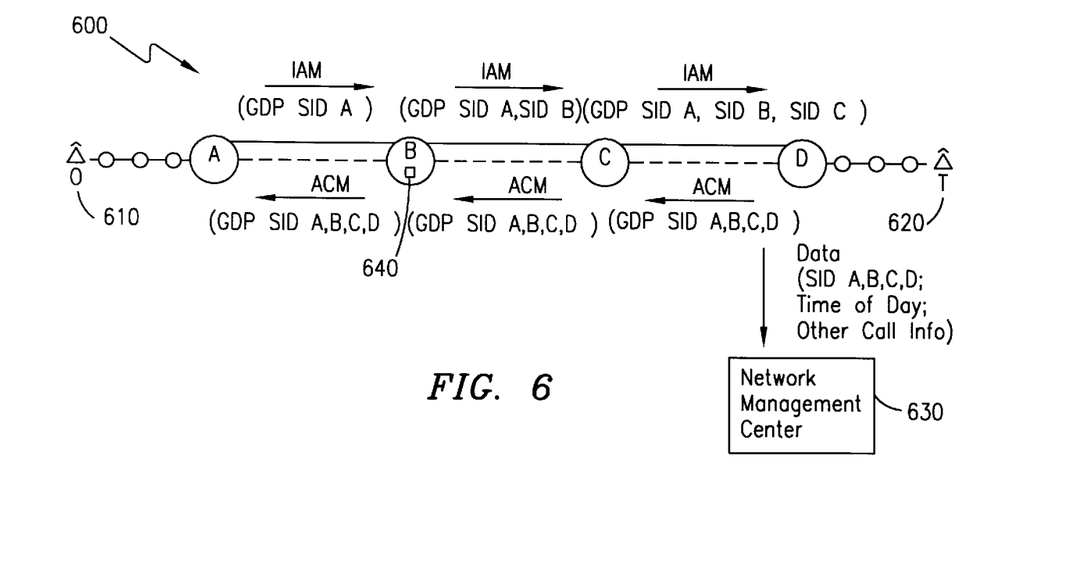
FIG. 6 illustrates a Network Call Trace (NCT) procedure in a telecommunications network using ISUP signaling according to a first preferred embodiment of the invention.

Referring now to FIG. 6, a Network Call Trace (NCT) using ISUP signaling is illustrated. The example of NCT 600 follows the diagraming conventions used in the other figures. Each circle (A, B, C, & D) represents an SSP, i.e., both a voice network switch and a SS7 network node. The solid lines represent signaling paths in the SS7 network, and the broken lines represent voice trunks. While the signaling paths are shown in FIG. 6 to extend directly from one SSP to another (like direct SS7 signaling paths 170 in FIG. 1) to facilitate understanding the invention, the invention is not to be so limited. The invention is equally applicable to situations where the ISUP messages travel through STPs or other parts of the SS7 network.

Now returning to a review of the diagraming conventions used in FIG. 6, the line/circle combination represents linking phone lines. Additionally, it is noted that an O 610 represents an originating subscriber, and a T 620 represents a terminating subscriber. Finally, while the ACM arrows are nearer the voice trunks for graphical clarity, it must be understood that both the IAMs and the ACMs are ISUP signals that traverse the signaling paths of the SS7 network.

According to a preferred embodiment of the invention, an originating subscriber (O) 610 dials the appropriate digits to begin the call setup procedure for a test call destined for a terminating subscriber (T) 620. In the IAM, there is included a GDP with TOD Network Call Trace. This causes the first, or originating switch, Switch A with SID A, to include its SID at the beginning of the network call trace list. Each intermediate, or tandem, switch will then likewise add its SID to the network call trace list as it transmits its IAM to the next nodal switch in route to the switch of the T 620. In NCT 600, for example, the IAM from Switch C to Switch D includes in the Generic Digits Parameter (GDP) "'SID A' 'SID B' 'SID C'". In this manner, the path of the call routing process can be recorded. Then, before the data is provided for analysis, the last, or terminating, switch also adds its SID to the network call trace list.

A first preferred technique for providing the network call trace list data for analysis proceeds as follows. The terminating switch, Switch D in the example of NCT 600, returns the backward message ACM with GDP including "SID A,B,C,D". This backward message propagates through the SS7 network along the route of the setup process. Eventually, the originating switch, Switch A in NCT 600, will receive the ACM with the complete list of the SIDs that constitute the connection between the O 610 and the T 620. This network call trace list of SIDs can then be displayed on either, for example, a printer or a terminal screen. Also, it should be noted that a test call utilizing Network Call Trace need not originate with an actual subscriber. A test call could be placed from a switch or a network management center, such as the OSS 160 (as explained with reference to FIG. 1). Also, any backward message, e.g., ACM, ANM, CPG, or REL, may preferably be used to transmit the complete list of SIDs.

A second preferred technique for providing the network call trace list data for analysis proceeds as follows. The terminating switch, Switch D in NCT 600, transmits the collected network call trace data to a Network Management Center (NMC) 630. This transmission preferably occurs over an SS7 network using ISUP signaling and can be, for example, directed to an OSS (like the OSS 160 in FIG. 1). The data preferably includes "SID A,B,C,D", "Time of Day" (of the call), and other call information. The data could also include information regarding the condition of individual network nodes that was garnered during the setup process.

Another preferred embodiment ensures that as much trace information as possible is received. Some switches, the terminating switch for example, may not support the Network Call Trace feature. It is within the scope of the invention for the intermediate ACMs, which are returned in backward messages from intermediate exchanges during the call setup process, to also include a list of SIDs. The list can include the SIDs in the connection process from the originating switch to the ACM-sending intermediate switch.

Another preferred embodiment that maximizes the trace information received but also minimizes redundant transmissions is explained. Each intermediate switch stores the list of SIDs (including its own) in, for example, Switch Memory 640 in Switch B. Then, when REL (or, for example, RLC) is received from a switch downstream (nearer the terminating switch), Switch B will append the list of SIDs from Switch Memory 640 before forwarding REL under the following condition: When Switch B has not previously received an ACM, CPG, ANM, REL (or other backward message) with Network Call Trace TOD in the GDP. Consequently, if Switch C or D fails to support Network Call Trace (and thus will fail to send a backward message with Network Call Trace TOD and a more-complete list of SIDs), then Switch A will at least receive a list of SIDs that reflect the call path up to the furthermost point that the Network Call Trace feature is supported. In other words, Switch B will normally receive from a downstream switch a more-complete list of SIDs that corresponds to the less-complete list of SIDs in its own memory. When this fails to occur, then Switch B will send the less-complete list that it is has stored in its Switch Memory 640. It should be noted that a final backward message category would include, at least, both REL and RLC. Also, it should be stressed (i) that in this embodiment each intermediate switch stores the list of SIDs (not only Switch B as explicitly pictured in FIG. 6) and (ii) that each intermediate switch is prepared to forward its incomplete list of SIDs upon receipt of a final backward message when no corresponding, more-complete NCT list is or has been received.

Figure 7A:
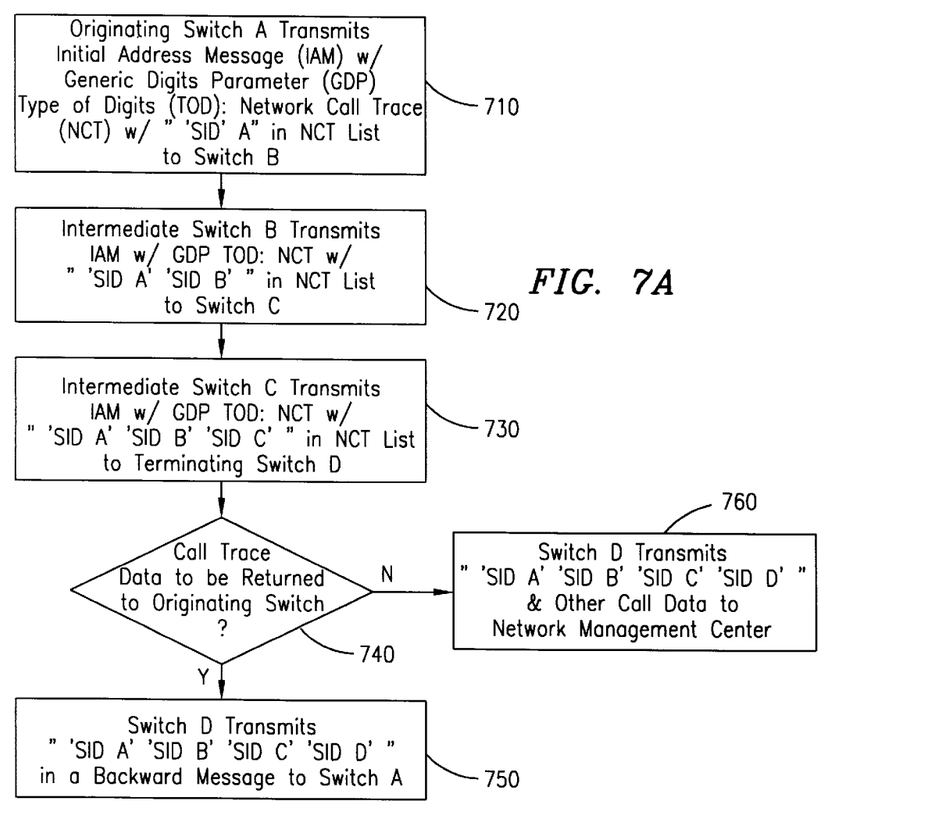
FIG. 7A illustrates in flow chart form a Network Call Trace (NCT) procedure in a telecommunications network using ISUP signaling according to the first preferred embodiment of the invention.

Referring now to FIG. 7A, a flowchart illustrates a Network Call Trace (NCT) procedure like that generally depicted in FIG. 6. A request for the procedure is recognized, and the procedure itself is implemented, by electronic components, such as a computer, under the direction of the NCT TOD in the GDP of an IAM. This procedure has practical applications in the telecommunications arts because, for example, it enables the production of a listing of switches through which a call has been routed. The listing can then be analyzed and inefficiencies in call routing eliminated. The command (e.g., program) implementing the NCT can be stored in memory. The memory can be either volatile or non-volatile; either solid-state or not solid-state; and any variety such as RAM, EEPROM, disk (hard or floppy), optical, etc. This memory could be, for example, part of Switch Memory 640. Furthermore, the command can be implemented by a processor in conjunction with the memory.

Continuing with FIG. 7A, in Step 710, the Originating Switch A transmits an IAM with GDP TOD: NCT with "'SID A'" in an NCT list to Intermediate Switch B. In Step 720, Intermediate Switch B has received the NCT list from Switch A, and Switch B transmits IAM with GDP TOD: NCT "'SID A' 'SID B'" in the NCT list to Intermediate Switch C. In Step 730, Intermediate Switch C has received the NCT list from Intermediate Switch B, and Intermediate Switch C transmits IAM with GDP TOD: NCT "'SID A' 'SID B' 'SID C'" in the NCT list to Terminating Switch D. In decision Step 740, it is determined whether the call trace data is to be returned to Originating Switch A. If it is to be returned, then Terminating Switch D transmits "'SID A' 'SID B' 'SID C' 'SID D'" in a backward message to Originating Switch A. If it is not to be returned, then Terminating Switch D transmits "'SID A' 'SID B' 'SID C' 'SID D'" and possibly other call data to the Network Management Center 630.

Figure 7B:
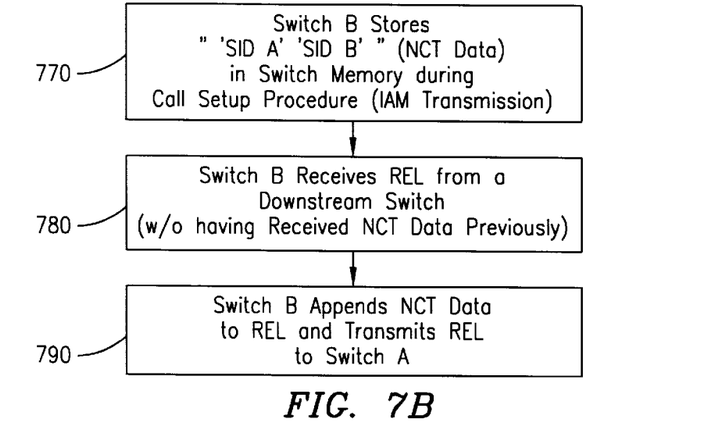
FIG. 7B illustrates in flow chart form a Network Call Trace (NCT) procedure in a telecommunications network using ISUP signaling according to a second preferred embodiment of the invention.

Referring now to FIG. 7B, a flowchart illustrates a Network Call Trace (NCT) procedure like that of FIG. 6 when Intermediate Switch B has stored the NCT List of SIDs. In Step 770, Intermediate Switch B stores "'SID A' 'SID B'" (NCT Data) in Switch Memory 640 (of FIG. 6) during a call setup procedure (e.g., IAM transmission). It is noted that Switch Memory 640 can be, for example, volatile or non-volatile, solid-state or not solid-state, RAM, EEPROM, disk (hard or floppy), optical, etc. In step 780, Intermediate Switch B Receives REL (during the call teardown procedure) from a downstream (nearer the call termination point or from the call termination point) switch without having previously received any NCT Data from a downstream switch in a backward message. Consequently, in Step 790, Intermediate Switch B adds the NCT Data to REL and transmits REL to Originating Switch A. This procedure enables NCT Data to be produced at least to the furthermost point along the connection for which the GDP TOD: NCT is supported.

In another aspect of the current invention, excessively long call trace results are anticipated, and action is taken to prevent exceeding the maximum length of ISUP messages. The maximum length is governed by the SIF 412 (of FIG. 4A), which can contain a maximum of 272 octets. This provision of the current invention reduces the length of an NCT list that will, or possibly could, exceed this maximum length. An object of this aspect of the current invention is to retain as much information from the initial phase or phases of a call trace as possible; therefore, the NCT list is truncated by deleting the SIDs of the furthermost downstream switches. A sufficient number of SIDs are truncated to ensure that the remaining portion will not overflow the 272 octets that are available in the SIF 412.

Though the invention has been described in terms of the telephone network, it is not so limited. It can be advantageously implemented in any network employing ISUP, or a similar, protocol. Furthermore, the parameter specifying that the Network Call Trace procedure should be executed need not be a Type of Digits in the Generic Digits Parameter; implementation of NCT as a TOD is merely a preferred embodiment. Also, it is preferred that the network call trace list of SIDs be returned in the first backward message; though ACM, ANM, CPG, and REL are specifically enumerated as possible first backward messages, it should be noted that any message (whether backward or not, whether first or not, and whether one of those listed above or not) may be used to transmit the list of SIDs to a facility for analysis.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for call tracing in a nodal network system having at least a first, second, and third interconnected nodes, said method comprising the steps of:
   (a) transmitting, from said first node to said second node, a first node identification (NID) list, said first NID list including therein a first NID;
   (b) transmitting, from said second node to said third node, a second NID list, said second NID list including therein a second NID and said first NID; and
   wherein said step (b) further comprises the step of:
   responding to a call trace indication in a Generic Digits Parameter (GDP) of an Initial Address Message (IAM).

2. The method of claim 1, further comprising the step of:
   (c) transmitting, from said third node, a third NID list, said third NID list including therein a third NID and said first and second NIDs.

3. The method of claim 2, wherein said step (c) of transmitting, from said third node, said third NID list further comprises:
   transmitting said third NID list to said first node.

4. The method of claim 3, wherein said step of transmitting said third NID list to said first node further comprises:
   transmitting said third NID list over a control part of said nodal network system.

5. The method of claim 4, wherein said step of transmitting said third NID list to said first node further comprises:
   transmitting a first backward message using Integrated Services Digital Network (ISDN) User Part (ISUP) signaling.

6. The method of claim 2, wherein said step (c) of transmitting, from said third node, said third NID list further comprises:
   transmitting said third NID list to a network management center.

7. The method of claim 1, wherein:
   said nodal network system comprises a telecommunications system;
   said first, second, and third interconnected nodes comprise first, second, and third switches in said telecommunications system; and
   said NIDs comprise Switch IDs (SIDs).

8. The method of claim 7, wherein said call trace indication comprises a Network Call Trace (NCT) Type of Digit (TOD).

9. A method for call tracing in a nodal network system having at least a first, second, and third interconnected nodes, said method comprising the steps of:
(a) transmitting, from said first node to said second node, a first node identification (NID) list, said first NID list including therein a first NID;
(b) transmitting, from said second node to said third node, a second NID list, said second NID list including therein a second NID and said first NID;
(c) storing said second NID list in a memory in said second node; and
(d) transmitting the stored second NID list when said second node receives a final backward message and still has not received another NID list.

10. A network system for call tracing, said network system comprising:
first, second, and third interconnected nodes having first, second, and third node identifications (NIDs), respectively;
first transmission means for transmitting, from said first node to said second node, a first NID list, said first NID list including therein said first NID;
second transmission means for transmitting, from said second node to said third node, a second NID list, said second NID list including therein said first and second NIDs; and
wherein said second transmission means for transmitting further comprises:
means for responding to a call trace indication in a Generic Digits Parameter (GDP) of an Initial Address Message (IAM).

11. The network system of claim 10, further comprising:
third transmission means for transmitting, from said third node, a third NID list, said third NID list including therein said first, second, and third NIDS.

12. The network system of claim 11, wherein said third transmission means for transmitting further comprises:
fourth transmission means for transmitting said third NID list to said first node.

13. The network system of claim 12, wherein said fourth transmission means for transmitting further comprises:
fifth transmission means for transmitting said third NID list over a control part of said network system.

14. The network system of claim 13, wherein said fourth transmission means for transmitting further comprises:
sixth transmission means for transmitting a first backward message using Integrated Services Digital Network (ISDN) User Part (ISUP) signaling.

15. The network system of claim 11, wherein said third transmission means for transmitting further comprises:
seventh transmission means for transmitting said third NID list to a network management center.

16. The network system of claim 10, wherein:
said network system comprises a telecommunications system;
said first, second, and third interconnected nodes comprise first, second, and third switches in said telecommunications system; and
said NIDs comprise Switch IDs (SIDs).

17. The network system of claim 16, wherein said call trace indication comprises a Network Call Trace (NCT) Type of Digit (TOD).

18. A network system for call tracing, said network system comprising:
first, second, and third interconnected nodes having first, second, and third node identifications (NIDs), respectively;
first transmission means for transmitting, from said first node to said second node, a first NID list, said first NID list including therein said first NID;
second transmission means for transmitting, from said second node to said third node, a second NID list, said second NID list including therein said first and second NIDs;
a memory in said second node;
means for storing said second NID list in said memory; and
eighth transmission means for transmitting the stored second NID list when said second node receives a final backward message and still has not received another NID list.

19. In a telecommunications system, a protocol extension for recording a path of a connection in said telecommunications system, said protocol extension comprising:
means for communicating within said telecommunications system;
means for effectuating a network call trace (NCT) along said path of said connection in said telecommunications system; and
wherein:
said means for communicating within said telecommunications system further comprises means for receiving and transmitting Integrated Services Digital Network (ISDN) User Part (ISUP) messages; and
said means for effectuating an NCT further comprises a type of digit (TOD) in a generic digits parameter (GDP).

20. The protocol extension of claim 19, wherein said means for effectuating an NCT further comprises:
a part of an initial address message (IAM).

21. An electronically-executable command in a memory, said command comprising:
means for recognizing a Network Call Trace (NCT) request;
means for implementing at least part of an NCT request; and
wherein:
said means for recognizing an NCT request and said means for implementing at least part of an NCT request both interact with Integrated Services Digital Network (ISDN) User Part (ISUP) signaling; and
said means for recognizing an NCT request further comprises means for analyzing a Type of Digit (TOD) in a Generic Digits Parameter (GDP).

22. The electronically-executable command of claim 21, wherein:
said means for implementing at least part of an NCT request further comprises means for responding to an Initial Address Message (IAM).

23. A method for call tracing in a telecommunications switch, said method comprising the steps of:
(a) adding a switch identification (SID) to a SID list in conjunction with a call trace indication in a Generic Digits Parameter (GDP) of an Initial Address Message (IAM); and
(b) transmitting said SID in said SID list as part of a call procedure.

24. The method of claim 23, further comprising the step of:

(c) initiating said SID list, wherein said step (a) of adding therefore causes said SID list to be one entry in length; and wherein said step (b) of transmitting further comprises the step of transmitting said IAM having said GDP, said call trace indication comprising a Type of Digit (TOD) being Network Call Trace (NCT).

25. The method of claim 24, further comprising the steps of:

(d) receiving another SID list in a backward message; and (e) providing said another SID list for analysis.

26. A method for call tracing in a telecommunications switch, said method comprising the steps of:

(a) adding a switch identification (SID) to a SID list;

(b) transmitting said SID in said SID list as part of a call procedure;

(c) receiving said SID list prior to said step (a) of adding;

(d) storing said SID list in a memory; and (e) subsequently transmitting said SID list upstream in a backward message when said switch neither contemporaneously receives nor previously has received another SID list from a downstream switch.

27. The method of claim 23, further comprising the step of:

(c) receiving said SID list prior to said step (a) of adding; and wherein said step (b) of transmitting further comprises the step of:

transmitting said SID list to an originating switch.

28. The method of claim 23, further comprising the step of:

(c) receiving said SID list prior to said step (a) of adding; and wherein said step (b) of transmitting further comprises the step of:

transmitting said SID list to a network management center.

29. A telecommunications switch for call tracing, said telecommunications switch comprising:

means for adding a switch identification (SID) to a SID list in conjunction with a call trace indication in a Generic Digits Parameter (GDP) of an Initial Address Message (IAM); and means for transmitting said SID in said SID list as part of a call procedure.

30. The telecommunications switch of claim 29, further comprising:

means for initiating said SID list, wherein said means for adding therefore causes said SID list to be one entry in length; and wherein said means for transmitting said SID in said SID list further comprises means for transmitting said IAM having said GDP, said call trace indication comprising a Type of Digit (TOD) being Network Call Trace (NCT).

31. The telecommunications switch of claim 30, further comprising:

means for receiving another SID list in a backward message; and means for providing said another SID list for analysis.

32. A telecommunications switch for call tracing, said telecommunications switch comprising:

means for adding a switch identification (SID) to a SID list;

means for transmitting said SID in said SID list as part of a call procedure;

means for receiving said SID list, said means for receiving operating prior to said means for adding;

memory means;

means for storing said SID list in said memory means; and means for subsequently transmitting said SID list upstream in a backward message when said switch neither contemporaneously receives nor previously has received another SID list from a downstream switch.

33. The telecommunications switch of claim 29, further comprising:

means for receiving said SID list, said means for receiving operating prior to said means for adding; and wherein said means for transmitting said SID in said SID list further comprises:

means for transmitting said SID list to an originating switch.

34. The telecommunications switch of claim 29, further comprising:

means for receiving said SID list, said means for receiving operating prior to said means for adding; and wherein said means for transmitting said SID in said SID list further comprises:

means for transmitting said SID list to a network management center.

* * * * *

UNITED STATES PATENT AND TRADEMARK OFFICE
CERTIFICATE OF CORRECTION

PATENT NO. : 6,137,876
DATED : October 24, 2000
INVENTOR(S) : Wong, et al.

It is certified that error appears in the above-identified patent and that said Letters Patent is hereby corrected as shown below:

| | |
|---|---|
| Column 1, line 62 | Replace "e.g;," With --e.g.,-- |
| Column 4, line 46 | Replace "furthermost" With --furtherest-- |
| Column 7, line 14 | Replace "effectuate" With --effectuator-- |
| Column 8, line 51 | Replace "furthermost" With --furtherest-- |
| Column 9, line 51 | Replace "furthermost" With --furtherest-- |
| Column 9, line 64 | Replace "furthermost" With --furtherest-- |
| Column 11, line 39 | Replace "NIDS" With --NIDs-- |

Signed and Sealed this

Fifteenth Day of May, 2001

Attest:

NICHOLAS P. GODICI

Attesting Officer      Acting Director of the United States Patent and Trademark Office